United States Patent
Kuhn et al.

(10) Patent No.: US 11,356,033 B2
(45) Date of Patent: Jun. 7, 2022

(54) MODULAR MULTI-POINT CONVERTER WITH MODULAR STORAGE UNITS

(71) Applicant: SIEMENS ENERGY GLOBAL GMBH & CO. KG, Munich (DE)

(72) Inventors: German Kuhn, Erlangen (DE); Oliver Kuhn, Erlangen (DE); Hubert Rubenbauer, Bubenreuth (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/257,627

(22) PCT Filed: Jul. 4, 2018

(86) PCT No.: PCT/EP2018/068138
§ 371 (c)(1),
(2) Date: Jan. 4, 2021

(87) PCT Pub. No.: WO2020/007464
PCT Pub. Date: Jan. 9, 2020

(65) Prior Publication Data
US 2021/0288591 A1    Sep. 16, 2021

(51) Int. Cl.
*H02M 7/483* (2007.01)
*H02J 3/18* (2006.01)
(Continued)

(52) U.S. Cl.
CPC ......... *H02M 7/4835* (2021.05); *H02J 3/1857* (2013.01); *H02J 3/32* (2013.01);
(Continued)

(58) Field of Classification Search
CPC ........ H02M 7/4835; H02J 3/1857; H02J 3/32; H02J 7/0024; Y02E 40/20
See application file for complete search history.

(56) References Cited

U.S. PATENT DOCUMENTS

| 10,333,309 B2* | 6/2019 | Alvarez Valenzuela .................... H02J 3/1857 |
| 2008/0310205 A1* | 12/2008 | Hiller .................... H02M 7/483 363/131 |

(Continued)

FOREIGN PATENT DOCUMENTS

| CN | 104269875 A | 1/2015 |
| DE | 102012210010 A1 | 12/2013 |

(Continued)

OTHER PUBLICATIONS

Hagar Abdelrahman et al: "Generalized multi-cell voltage sourced converter"; Power Electronics and Applications; EPE'09, 13th European Conference on Power Electronics and Applications; 2009: EPE '09 ; Sep. 8-10, 2009, Barcelona, Spain, IEEE, Piscataway, NJ, USA,pp. 1-6; ISBN: 978-1-4244-4432-8; XP031541853, Figure 13, pp. 5, left column, paragraph 1; 2009.

(Continued)

*Primary Examiner* — Yusef A Ahmed
(74) *Attorney, Agent, or Firm* — Laurence A. Greenberg; Werner H. Stemer; Ralph E. Locher

(57) ABSTRACT

A converter assembly has a converter with multiple converter valves, each with a plurality of semiconductor switches, and with a stored energy source branch which is connected in parallel with at least one of the converter valves. The stored energy source branch has voltage converter modules and stored energy source modules. The voltage converter modules are connected to one another in a series circuit on the input side and to the respectively associated stored energy source module on the output side. There is also described an assembly having the stored energy source branch and a method for stabilizing an alternating current system by way of the converter assembly.

13 Claims, 4 Drawing Sheets

(51) Int. Cl.
   *H02J 3/32*      (2006.01)
   *H02J 7/00*      (2006.01)
   *H02M 7/49*      (2007.01)
   *H02M 7/5387*    (2007.01)

(52) U.S. Cl.
   CPC ........... *H02J 7/0024* (2013.01); *H02M 7/483* (2013.01); *H02M 7/49* (2013.01); *H02M 7/53871* (2013.01)

(56) References Cited

U.S. PATENT DOCUMENTS

| | | | | |
|---|---|---|---|---|
| 2012/0243282 A1* | 9/2012 | Marquardt | .............. | H02M 7/49 363/132 |
| 2013/0069424 A1* | 3/2013 | Kajouke | ................ | B60L 53/63 307/9.1 |
| 2014/0028266 A1* | 1/2014 | Demetriades | ......... | H02M 7/797 320/136 |
| 2014/0049230 A1* | 2/2014 | Weyh | .................... | H02M 7/483 323/207 |
| 2014/0226377 A1* | 8/2014 | Goetz | ................ | H02M 3/1582 363/65 |
| 2014/0347898 A1* | 11/2014 | Raju | .................... | H02M 7/217 363/35 |
| 2016/0241127 A1* | 8/2016 | Jasim | .................... | H02M 1/14 |
| 2016/0261123 A1* | 9/2016 | Rapp | ...................... | H02M 7/44 |
| 2016/0352239 A1* | 12/2016 | Trainer | ................ | H02M 5/458 |
| 2017/0077834 A1* | 3/2017 | Trainer | ................ | H02M 7/483 |
| 2017/0163043 A1* | 6/2017 | Garces | .................. | H02M 7/483 |
| 2017/0207631 A1* | 7/2017 | Helling | .................... | H02J 3/382 |
| 2018/0109202 A1* | 4/2018 | Marquardt | .............. | H02P 9/006 |
| 2018/0212530 A1* | 7/2018 | Gotz | ...................... | H02M 7/003 |
| 2018/0269795 A1* | 9/2018 | Zhou | .................. | H02M 3/33584 |
| 2018/0323698 A1* | 11/2018 | Oh | .......................... | H01H 50/18 |
| 2019/0052187 A1* | 2/2019 | Geske | ...................... | H02M 1/32 |
| 2019/0068081 A1* | 2/2019 | Trainer | ................ | H02M 7/487 |
| 2019/0372478 A1* | 12/2019 | Trainer | ................ | H02M 7/797 |
| 2020/0007029 A1* | 1/2020 | Jones | ...................... | H02M 1/32 |
| 2020/0136383 A1* | 4/2020 | Buchhold | ................ | H02J 1/10 |
| 2020/0338997 A1* | 10/2020 | Goetz | .................. | H02J 7/0016 |
| 2021/0036600 A1* | 2/2021 | Xie | ...................... | H02M 1/36 |
| 2021/0111642 A1* | 4/2021 | Weyh | .................... | H02M 7/483 |

FOREIGN PATENT DOCUMENTS

| | | |
|---|---|---|
| EP | 2608393 A1 | 6/2013 |
| WO | WO 2010102667 A1 | 9/2010 |
| WO | WO 2016150466 A1 | 9/2016 |
| WO | WO 2018013594 A1 | 1/2018 |

OTHER PUBLICATIONS

Ionut Trintis et al: "A new modular multilevel converter with integrated energy storage", IECON 2011—37th Annual Conference on IEEE Industrial Electronics Society, IEEE, pp. 1075-1080, XP032104632, DOI: 10.1109/IECON.2011.6119457; ISBN: 978-1-61284-969-0; Figures 1,2; 2011.

* cited by examiner

MODULAR MULTI-POINT CONVERTER WITH MODULAR STORAGE UNITS

BACKGROUND OF THE INVENTION

Field of the Invention

The invention relates to a converter arrangement having a converter with a plurality of converter valves which in each case have a multiplicity of semiconductor circuits, and having an energy storage branch which is arranged parallel to at least one of the converter valves.

The energy revolution and the concomitant increasing use of volatile energy generators have resulted in an increasing demand for ever-greater energy storage capacities in electrical energy supply systems.

A concept for using energy storage devices storing active power interacting with modular multilevel converters is known from the international patent application with file reference PCT/EP2018/051556. According to this known concept, a storage arrangement is provided on the DC voltage side of the modular multilevel converter which is arranged in the double-star topology and is connected on the AC voltage side to an AC voltage network. The storage arrangement comprises a multiplicity of parallel-connected series circuits of energy storage elements. One advantage of this concept lies in the facility to integrate energy storage devices having DC current connections at the lower voltage level with systems having DC current connections at the higher voltage level.

An alternative concept to this is disclosed in WO 2016/150466 A1. The modular multilevel converter described there comprises converter valves, in each case having a series connection of switching modules. The converter valves can be interconnected, for example, in a delta or star point connection and can be connected to an AC voltage network.

Dedicated storage modules are connected in each case to the switching modules.

SUMMARY OF THE INVENTION

The object of the invention is to propose a converter arrangement of the aforementioned type which is usable as efficiently as possible and is as reliable as possible.

The object is achieved according to the invention with a converter arrangement of the aforementioned type in that the energy storage branch comprises voltage converter modules and energy storage modules assigned to them, wherein the voltage converter modules are interconnected in a series circuit on the input side and are connected to the respectively assigned energy storage module on the output side. The energy storage branch extends accordingly in a parallel connection to the at least one converter valve. The converter valves can extend, for example, in a delta connection in each case between two AC voltage connections of the converter for connecting to an AC voltage network. According to a further example, the converter extends between a first and a second DC voltage pole, wherein the energy storage branch extends parallel to the converter, similarly between the two DC voltage poles. The converter has, for example, at least one phase branch, wherein the phase branch extends between the first and the second DC voltage pole and comprises an AC voltage connection for connecting to a phase line of an AC voltage network, and a first and a second converter valve, wherein a first converter valve is arranged between the first DC voltage pole and the AC voltage connection, and a second converter valve is arranged between the AC voltage connection and the second DC voltage pole. The energy storage branch extends here on the DC voltage side of the converter between the DC voltage poles. One application of such configurations is, for example, the stabilization of the AC voltage network. According to a different example, the converter has a first and a second DC voltage side as a DC/DC converter, wherein the energy storage branch extends parallel to one of the DC voltage sides. This is conceivable, for example, for a connection of PV modules to a DC circuit. It is possible here, for example, to connect a solar windfarm directly to an electrolysis farm without using AC voltage.

The energy storage branch extends accordingly on the DC voltage side of the converter parallel to the phase branch of said converter. The converter is generally any converter which, in its multi-phase design, i.e. having a plurality of phase branches between the DC voltage poles, forms a double-star arrangement. In particular, the energy storage branch is only indirectly connectable via the converter to the AC voltage network, and therefore comprises no dedicated AC voltage connection for connecting to the AC voltage network. Each voltage converter module is inserted on the input side into the series circuit and is connected on the output side to the energy storage module assigned to it. Each voltage converter module thus corresponds to a DC/DC converter. The voltage converter module is configured to convert an input-site voltage into an output-side voltage on the assigned energy storage module, or vice versa.

One advantage of the invention compared with the storage modules integrated into switching modules of the converter is that the energy storage branch can be simply and flexibly connected to different converter systems without the converter having to be specifically adapted. The energy storage branch can thus have a design that is independent from the converter, and an independent regulation. A further advantage is that the energy storage branch is disconnected or decoupled from the AC voltage side of the converter if the converter is connected to an AC voltage network. In this way, the energy storage branch is not directly affected by faults on the AC voltage side.

A further advantage of the invention lies in the connection of the individual energy storage modules via the voltage converter modules. In this way, energy storage modules of different types can be used in one energy storage branch, as a result of which the entire converter arrangement is flexibly usable. In contrast, this flexibility would be severely restricted in a series circuit of directly interconnected energy storage devices, for example due to different current-carrying capabilities of different energy storage device types.

An additional advantage of the invention is the simple maintenance of individual energy storage modules without the entire energy storage branch having to be taken out of service. For this purpose, the voltage converter module can be bypassable on the input side or on the output side by means of a suitable bypass device, for example a bypass switch.

The converter arrangement can further comprise a plurality of energy storage branches which are arranged in each case parallel to one another between the DC voltage poles. The energy storage branches can be of the same design.

The energy storage modules can in each case comprise one or more energy storage devices. In the case of a plurality of energy storage devices, said devices can be interconnected in an electrical parallel circuit.

Furthermore, the converter arrangement preferably comprises an independent regulation unit to regulate the energy intake and energy withdrawal of the energy storage modules of the energy storage branch. The regulation unit is, in particular, independent from the converter regulation, thus allowing a dedicated control and regulation of the energy intake and energy withdrawal of the energy storage modules. The regulation unit allows, in particular, a triggering of controllable switches of the voltage converter modules and energy storage modules which is independent from the converter regulation. The flexibility of the entire converter arrangement is thus further increased. In the case of a plurality of parallel energy storage branches, either a regulation unit for regulating the voltage converter modules and energy storage modules of all energy storage branches can be present, or a dedicated, independent regulation unit can be assigned to each of the energy storage devices. A higher-level regulation unit or control unit can additionally be provided to coordinate the regulation unit and a converter regulation provided to regulate the converter.

The voltage converter modules are interconnected in the series circuit on the input side and are connected to the respectively assigned energy storage module on the output side. With this arrangement, the energy storage modules can simply be disconnected from the voltage converter modules for maintenance or in the event of a fault.

According to one embodiment of the invention, the voltage converter modules in each case comprise at least four interruptible semiconductor switches and an intermediate circuit capacitor. A DC voltage intermediate circuit is provided in the voltage converter module with the intermediate circuit capacitor. The semiconductor switches are suitably configured to connect or bypass the intermediate circuit capacitor on the input side of the voltage converter module. The energy storage module is appropriately connected to the voltage converter in such a way that the energy storage module is bypassable by means of one of the semiconductor switches of the voltage converter module.

At least a first and a second semiconductor switch of the energy storage module are connected to the intermediate circuit capacitor in a half-bridge circuit. The intermediate circuit capacitor is connected to the semiconductor switches in the half-bridge circuit in such a way that a voltage corresponding to the intermediate circuit capacitor voltage or a zero voltage can be generated on its connections, for example the input-side connections of the voltage converter module. The half-bridge circuit offers the advantage of relatively low electrical losses in its operation.

According to one embodiment of the invention, a third semiconductor switch and a parallel circuit connected in series thereto consisting of a fourth semiconductor switch and the energy storage module are arranged parallel to the intermediate circuit capacitor. The energy storage module can thus be bypassed by means of the fourth semiconductor switch.

An input connection of the voltage converter module can suitably be connected directly to an output connection of the voltage converter module. This simplifies the design of the modules. The connection can further be used, for example, for the common earthing of the components.

According to one embodiment of the invention, the voltage converter module and the energy storage module are galvanically isolated. This can also be referred to in this context as an isolating design. With this design, the energy storage module can be connected to earth potential so that no special protective measures need to be taken in respect of higher voltage levels. The galvanic isolation can be provided inductively, for example, in particular by means of a transformer.

An electrical connection between the voltage converter module and the energy storage module can appropriately be disconnectable by means of at least one interlock switch. In this way, an isolation coordination can be achieved even in a non-isolating design. For maintenance purposes, the at least one interlock switch can be opened so that an electrical interruption takes place.

An earthing device is preferably provided for earthing the energy storage module. The energy storage module can thus be connected to earth potential as the reference potential, for example in the event of maintenance or servicing.

The energy storage device of the energy storage module is preferably a supercapacitor, a battery, a flywheel energy storage device or the like. The choice of an energy storage device for the energy storage module can be made flexibly on the basis of the topology of the converter arrangement and can be adapted to the respective application. A configuration is further possible in which a first energy storage module can be used only to input and not to output electrical energy into/from storage. One example here is the use of an electrolyzer.

According to one embodiment of the invention, the converter arrangement comprises different energy storage modules having energy storage devices with different storage characteristics. Different storage characteristics (e.g. short-term and long-term storage or energy storage with high and low powers) can be combined within the converter arrangement through the use of different storage technologies. This can produce an overall characteristic by means of which the converter arrangement can support different functionalities, such as e.g. frequency support through brief, high active power provision, day/night balancing with significantly longer, albeit lower, storage capacities.

The converter is suitably a modular multilevel converter. In its basic design, a modular multilevel converter (MMC) in each case comprises two converter arms per phase branch which in each case extend between one of the DC voltage poles and the AC voltage connection. Each converter arm comprises a series connection of two-pole switching modules. Switching modules in a half-bridge circuit or in a full-bridge circuit are frequently used switching module types. Each of the switching modules of the modular multilevel converter is individually controllable by means of a control device. A voltage dropping on one of the converter arms is equal to the sum of voltages dropping on the associated switching modules. A particularly advantageous stepped converter voltage can be generated by means of the MMC on its AC voltage connection. The use of supercapacitors in modular multilevel DC/DC converters is known from the paper entitled "Design and Control of a Modular Multilevel DC/DC converter for Regenerative Applications" by Montesinos-Miracle et al.

According to one example embodiment of the invention, the voltage converter module and the assigned energy storage device in each case have a separate housing. This arrangement advantageously simplifies the maintenance of the converter arrangement. The modularity thereof is also increased in this way.

The invention further relates to an arrangement for providing an electrical active power, wherein the arrangement comprises an energy storage branch which is connectable to a converter valve of a converter.

The object of the invention is to provide an arrangement of this type which is usable as flexibly as possible and is reliable during operation.

The object is achieved by an arrangement of the aforementioned type in which the energy storage branch comprises voltage converter modules and energy storage modules assigned to them, wherein the voltage converter modules are interconnected in the series circuit on the input side and are connected to the respectively assigned energy storage module on the output side.

The advantages of the arrangement according to the invention correspond to those explained above in connection with the converter arrangement according to the invention. The advantageous designs of the arrangement according to the invention have already been described above in connection with the converter arrangement according to the invention and can obviously be used alone or in combination in connection with the arrangement according to the invention.

Generally speaking, the energy storage branch advantageously enables a flexible connection of DC sources and DC sinks (provided by the energy storage devices of the energy storage modules) at low-voltage level to a DC circuit at high-voltage level. The DC circuit can be formed by the DC voltage side of a converter. The arrangement can appropriately be used to exchange active power with an AC voltage network by means of a converter, wherein the arrangement is connectable, for example, to the DC voltage side of the converter.

The invention further relates to a method for stabilizing an AC voltage network.

The object of the invention consists in indicating a method of this type which is usable as flexibly as possible.

The object is achieved in the method of the aforementioned type in that a reactive power and/or an active power is/are fed into the AC voltage network or is/are withdrawn from the AC voltage network by means of a converter arrangement according to the invention.

The advantages of the method according to the invention result, in particular, from the advantages of the converter arrangement according to the invention already described above.

According to one embodiment of the method, electrical power is exchanged between the energy storage devices of the energy storage modules according to requirements. Energy can thus be transferred between the individual energy storage devices. Energy management thus becomes highly flexible.

Energy can be transferred not only within an individual energy storage branch, but also between parallel-connected energy storage branches. Energy storage devices of a first energy storage type, for example supercapacitors, can be recharged as required from energy storage devices of a second energy storage type, for example battery storage devices.

The invention is further explained below with reference to FIGS. 1 to 4.

DETAILED DESCRIPTION OF THE INVENTION

Figure 1:
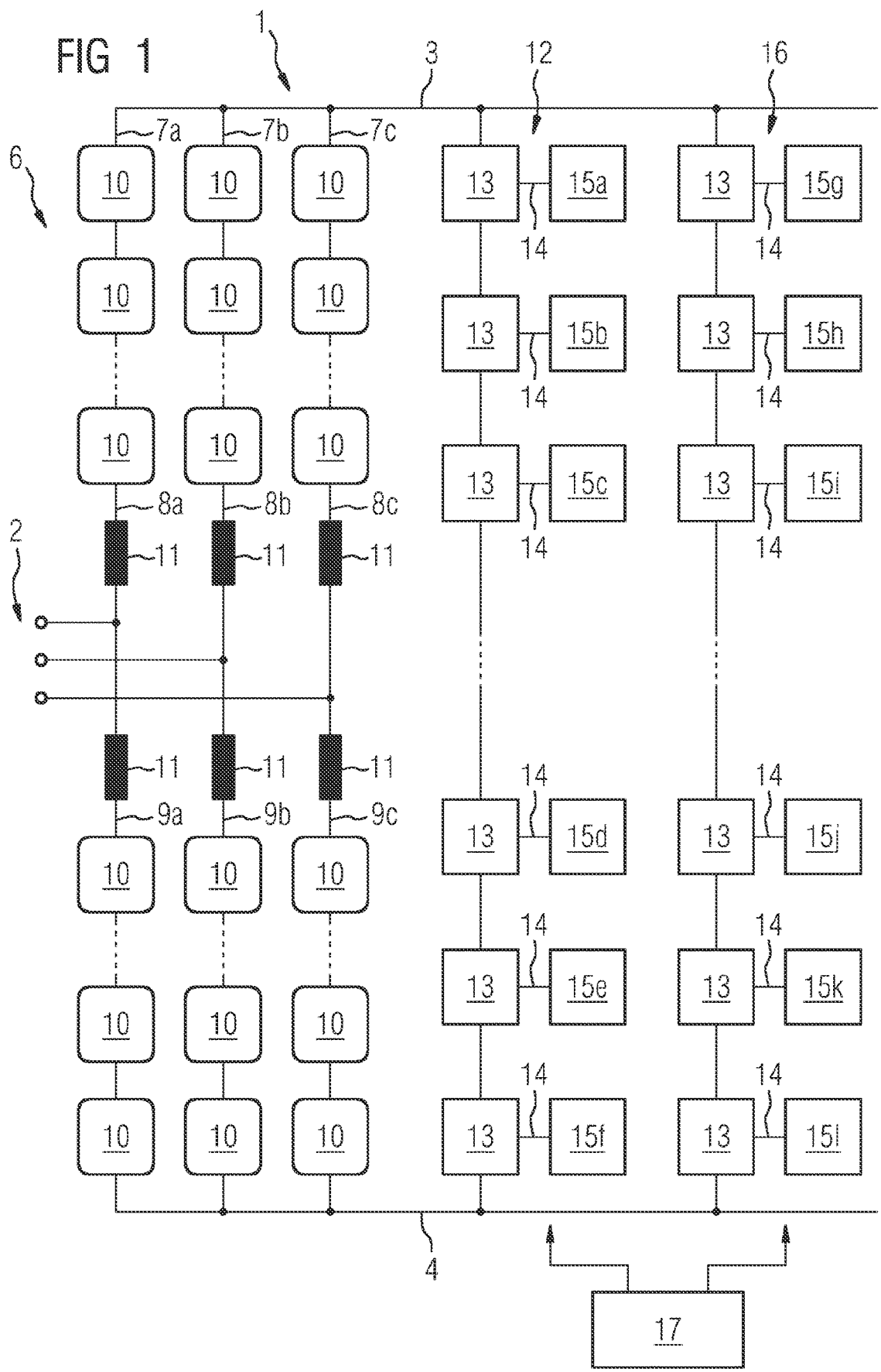
FIG. 1 shows a first example embodiment of a converter arrangement according to the invention in a schematic view.

FIG. 1 shows a converter arrangement 1. The converter arrangement 1 has an AC voltage side with a three-phase AC voltage connection 2 for connecting to an AC voltage network, and a DC voltage side with a first DC voltage pole 3 and a second DC voltage pole 4. The converter arrangement 1 comprises a converter 6 which is of three-phase design. The converter 6 accordingly has a first phase branch 7a, a second phase branch 7b and a third phase branch 7c. All three phase branches 7a-c extend between the DC voltage poles 3 and 4. Each phase branch 7a-c comprises a first or upper converter valve 8a-c which is arranged between the first DC voltage pole 3 and the AC voltage connection 2, and a second or lower converter valve 9a-c which is disposed between the AC voltage connection and the second DC voltage pole 4.

The converter 6 is a modular multilevel converter. Each of the converter valves 8a-c, 9a-c is designed as a converter arm having a series connection of two-pole switching modules 10. The number of switching modules 10 in one of the converter arms is essentially arbitrary and is adapted according to the respective application. The switching modules 10 are designed, for example, as full-bridge circuits or half-bridge circuits having interruptible semiconductor switches, although other circuit variants are also conceivable. An arm inductor 11 is further arranged in each of the converter arms. In the example shown in FIG. 1, all switching modules 10 are of similar design, although this does not generally have to be the case.

The converter arrangement 1 further comprises a first energy storage branch 12. The first energy storage branch 12 extends between the two DC voltage poles 3, 4 on the DC voltage side of the converter 6. Voltage converter modules 13 which are interconnected in a series circuit on the input side are arranged in the first energy storage branch 12. An energy storage module 15a-f is connected to an output 14 of each voltage converter module 13. The design of the voltage converter modules 13 and the energy storage modules 15a-f will be examined more closely in the following FIG. 2. Each of the energy storage modules 15a-f comprises an energy storage device. Different energy storage types are used in the converter arrangement 1. The energy storage modules 15a-c can thus comprise, for example, battery storage devices, whereas the energy storage modules 15d,e can in each case comprise supercapacitors or ultracaps, and the energy storage module 15f can comprise a storage device operated by an electrolyzer.

The converter arrangement 1 further comprises a second energy storage branch 16. The second energy storage branch 16 extends between the two DC voltage poles 3, 4 on the DC voltage side of the converter 12 and parallel to the first energy storage branch 12. Voltage converter modules 13 which are interconnected in a series circuit on the input side are arranged in the second energy storage branch 16. An energy storage module 15g-1 is connected to an output 14 of each voltage converter module 13. The design of the voltage converter modules 13 and the energy storage modules 15g-1 will be examined more closely in the following FIG. 2. Each of the energy storage modules 15g-1 comprises an energy storage device. Different energy storage types are used in the second energy storage branch 16. The energy storage modules 15g-j, for example, can comprise battery storage devices, the energy storage module 15k can comprise a flywheel energy storage device, and the energy storage module 15l can in turn comprise a battery.

The converter arrangement 1 further comprises a regulation unit 17 for regulating the energy input and energy withdrawal of the energy storage modules 15a-1. Semiconductor switches, in particular, of the voltage converter modules 13 can be controlled by means of the regulation unit 17. A higher-level regulation unit or control unit can be provided, for example, to coordinate the regulation unit 17 and a regulation unit of the converter 6 (not shown in the figures).

Figure 2:
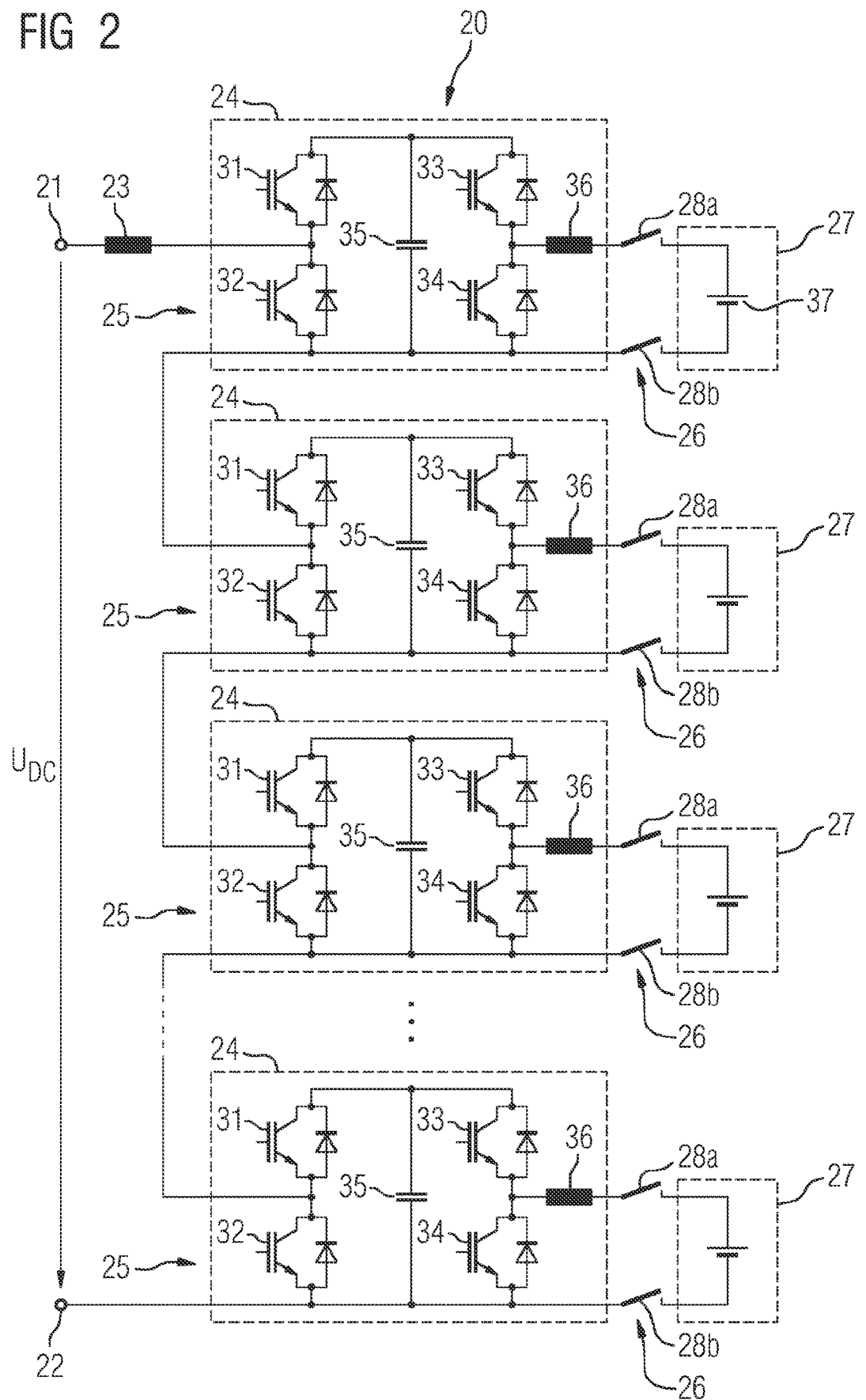
FIG. 2 shows an example of an energy storage branch of the converter arrangement from FIG. 1 in a schematic view.

FIG. 2 shows an example of an energy storage branch 20, which is usable as one of the energy storage branches 12, 16 of the converter arrangement 1 from FIG. 1. The energy storage branch 20 comprises a first connection 21 for connecting to a first DC voltage pole, and a second connection 22 for connecting to a second DC voltage pole. The energy storage branch 20 further comprises a branch choke 23. The energy storage branch 20 further comprises voltage converter modules 24 having an input side 25 and an output site 26. The voltage converter modules 24 are interconnected in a series circuit on the input side. Each voltage converter module 24 is connected to an energy storage module 27 assigned to it by means of interlock switches 28a,b on the output side.

The voltage converter module 24 comprises a first interruptible semiconductor switch 31, a second interruptible semiconductor switch 32, and an intermediate circuit capacitor 35 which are interconnected in a half-bridge circuit. The voltage converter module 24 further comprises a third interruptible semiconductor switch 33 and a fourth interruptible semiconductor switch 34, wherein the energy storage module 27 is bypassable by means of the fourth semiconductor switch 34. The voltage converter module 24 further comprises an inductor 36 which is arranged electrically in series with an energy storage device 37 of the energy storage module 27.

An energy storage voltage which is between 100 V and 10 kV in the fully charged state of the energy storage device 37 drops on each of the energy storage devices 37. A total energy storage branch voltage UDC can accordingly be in the range up to 500 kV in the example shown.

IGBT switches, for example, or other suitable interruptible semiconductor switches known to the person skilled in the art can be used here as interruptible semiconductor switches.

Figure 3:
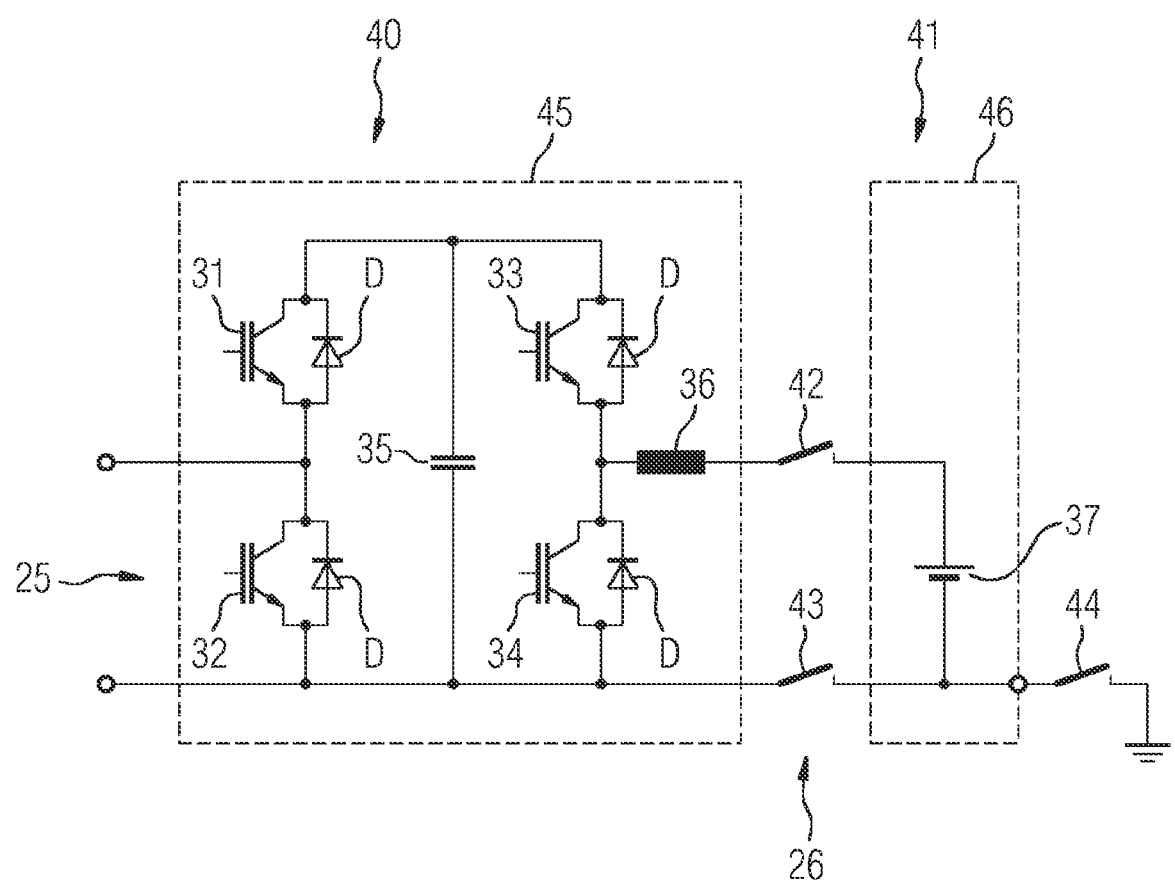
FIG. 3 shows an example of a voltage converter module and an energy storage module in a schematic view.

FIG. 3 shows an example of a voltage converter module 40 and an energy storage module 41 in a non-isolating design. This means that the voltage converter module 40 and the energy storage module 41 are not galvanically isolated from one another during their operation.

The voltage converter module 40 comprises four semiconductor switches 31-34 in the form of IGBTs, wherein a free-wheeling diode D is connected antiparallel to each of the semiconductor switches 31-34. The design of the voltage converter modules 40 otherwise corresponds to that of the voltage converter module 24 from FIG. 2, to which reference is made accordingly herewith. The same applies to the design of the energy storage module 41 whose design corresponds to that of the energy storage module 27 in FIG. 2.

The voltage converter module 40 and the energy storage module 41 in each case have their own housing 45 and 46 respectively which are detachably interconnectable via a first mechanical interlock switch 42 and a second mechanical interlock switch 43. An earthing switch 44 is provided for the earthing of the energy storage module 41. The interlock switches 42 and 43 are closed during operation, so that an electrical connection is established between the voltage converter module 40 and the energy storage module 41. The earthing switch 44 is opened. In the event of maintenance or servicing, the interlock switches 42 and 43 are opened so that the electrical connection between the voltage converter module 40 and the energy storage module 41 is interrupted. Conversely, the earthing switch 44 is closed.

Figure 4:
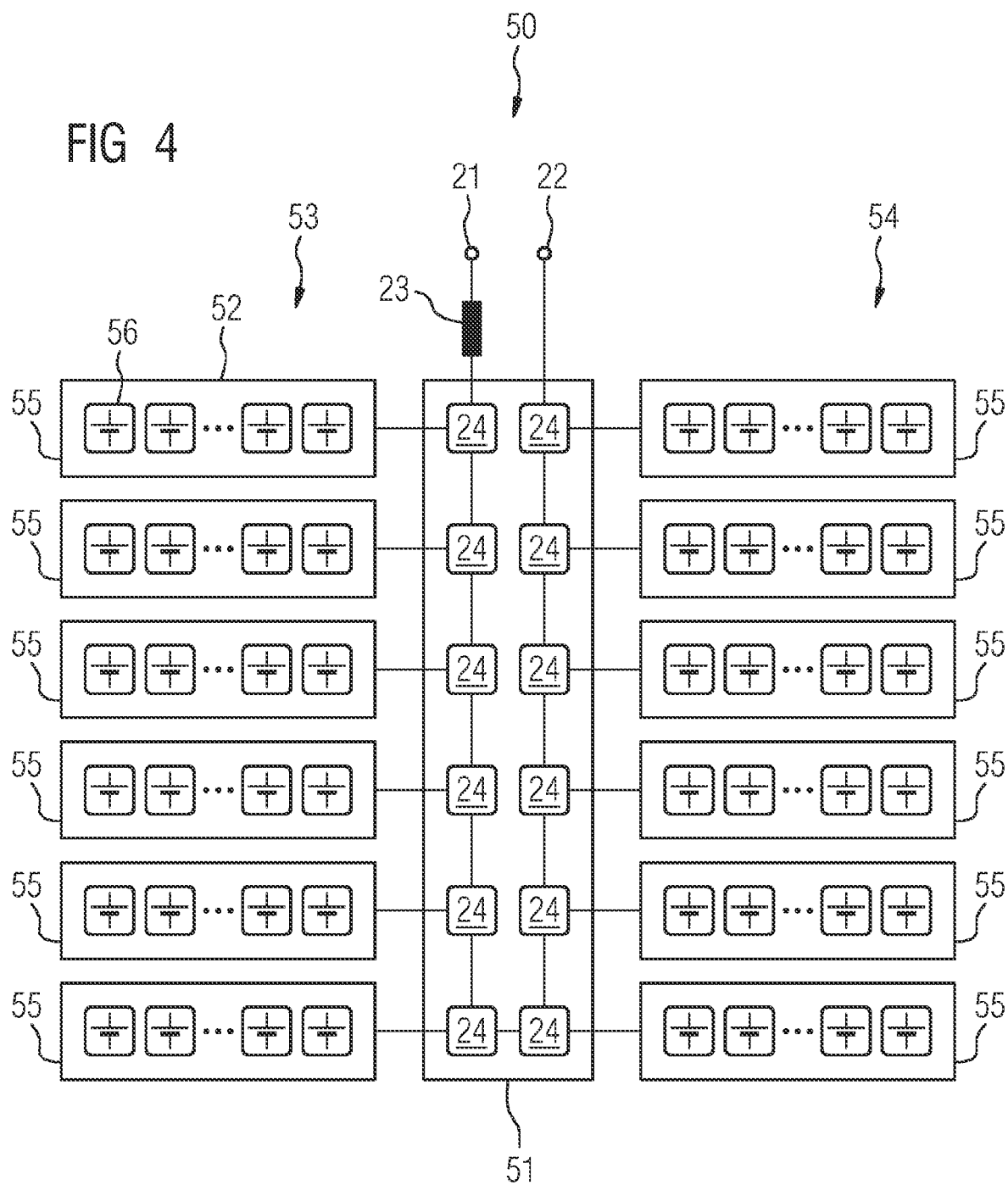
FIG. 4 shows a further example of an energy storage branch in a schematic view.

FIG. 4 shows a further example of an energy storage branch 50 which is suitable, for example, for the converter arrangement 1 from FIG. 1. The design of the energy storage branch 50 corresponds largely to that of the energy storage branch 20 in FIG. 2. In FIGS. 2 and 4, elements which are identical or of the same type are denoted with the same reference numbers so that only the differences between the energy storage branches 20 and 50 will be examined more closely below.

The voltage converter modules 24 of the energy storage branch 50 are arranged in a container 51. The arrangement of the voltage converter modules 24 corresponds to a U-shaped arrangement. The U-shaped arrangement of the voltage converter modules 24 allows the container 51 to be positioned spatially midway between the energy storage modules 55. Each of the energy storage modules 55 has its own container housing 52, so that the energy storage modules 55 can be arranged externally in arrangements 53, 54 alongside and/or above one another. This simplifies access to the energy storage modules 55 in the event of maintenance or servicing.

Unlike the energy storage modules 24 from FIG. 2, each of the energy storage modules 55 of the energy storage branch 50 comprises a multiplicity of energy storage devices 56 which are interconnected in an electrical parallel connection.

The invention claimed is:

1. A converter arrangement, comprising:
a converter having at least one AC voltage connection for connecting a phase line of an AC voltage network and at least one phase branch extending between a first DC voltage pole and a second DC voltage pole;
said converter having a plurality of converter valves, including a first converter valve connected between said at least one AC voltage connection and said first DC voltage pole, and a second converter valve connected between said at least one AC voltage connection and said second DC voltage pole, and each of said converter valves having a multiplicity of semiconductor switches;
an energy storage branch arranged in parallel with at least one of said converter valves and extending on a DC voltage side of said converter between said first and second DC voltage poles;
said energy storage branch having voltage converter modules and energy storage modules assigned to said voltage converter modules, said voltage converter modules being interconnected in a series circuit on an input side and having an output side connected to a respectively assigned energy storage module of said energy storage modules;
each of said voltage converter modules having at least four interruptible semiconductor switches and an intermediate circuit capacitor;
a respective energy storage module of said energy storage modules being connected to a respective voltage converter module of said voltage converter modules to enable said energy storage module to be bypassed by way of one of said at least four interruptible semiconductor switches of said respective voltage converter module;
at least one interlock switch configured to selectively disconnect an electrical connection between said respective voltage converter module of said voltage converter modules and said respective energy storage module of said energy storage modules; and a grounding device for grounding said respective energy storage module of said energy storage modules.

2. The converter arrangement according to claim 1, further comprising a regulation unit to regulate an energy intake and an energy withdrawal of each of said energy storage modules of said energy storage branch.

3. The converter arrangement according to claim 1, wherein at least a first semiconductor switch and a second semiconductor switch of said at least four interruptible semiconductor switches of said respective voltage converter module of said voltage converter modules are connected to said intermediate circuit capacitor in a half-bridge circuit.

4. The converter arrangement according to claim 3, wherein a third semiconductor switch of said at least four interruptible semiconductor switches and a parallel circuit connected in series thereto consisting of a fourth semiconductor switch of said at least four interruptible semiconductor switches and said respective energy storage module of said energy storage modules are arranged in parallel to said intermediate circuit capacitor.

5. The converter arrangement according to claim 1, wherein an output connection of said respective voltage converter module of said voltage converter modules is directly connected to an input connection of said respective energy storage module of said energy storage modules.

6. The converter arrangement according to claim 1, wherein said voltage converter modules and said energy storage modules are galvanically isolated.

7. The converter arrangement according to claim 1, wherein said respective energy storage module of said energy storage modules comprises a supercapacitor, a battery, or a flywheel energy storage device.

8. The converter arrangement according to claim 1, wherein said energy storage modules are different energy storage modules having energy storage devices with different storage characteristics.

9. The converter arrangement according to claim 1, wherein said converter is a modular multilevel converter.

10. The converter arrangement according to claim 1, which comprises a separate housing for each voltage converter module of said voltage converter modules and a separate housing for each energy storage module of said energy storage modules.

11. A method for stabilizing said AC voltage network, the method comprising:

providing said converter arrangement according to claim 1; and selectively feeding a reactive power or an active power into said AC voltage network or withdrawing a reactive power or an active power from said AC voltage network by way of said converter arrangement.

12. The method according to claim 11, which comprises exchanging electrical power between energy storage devices of said energy storage modules.

13. An arrangement for providing an electrical active power, the arrangement comprising:

an energy storage branch connectible to a converter valve in a phase branch of a converter, the converter having an AC voltage connection for connecting to said phase branch of a phase line of an AC voltage network;

said energy storage branch including voltage converter modules and energy storage modules assigned to said voltage converter modules;

said voltage converter modules having an input side interconnected in a series circuit and an output side connected to a respectively assigned energy storage module of said energy storage modules;

each of said voltage converter modules having at least four interruptible semiconductor switches and an intermediate circuit capacitor;

a respective energy storage module of said energy storage modules being connected to a respective voltage converter module of said voltage converter modules to enable said energy storage module to be bypassed by way of one of said at least four interruptible semiconductor switches of said respective voltage converter module;

at least one interlock switch configured to selectively disconnect an electrical connection between said respective voltage converter module of said voltage converter modules and said respective energy storage module of said energy storage modules; and a grounding device for grounding said respective energy storage module of said energy storage modules.

* * * * *